United States Patent [19]
Campolo et al.

[11] Patent Number: 5,642,248
[45] Date of Patent: Jun. 24, 1997

[54] ELECTRICAL EXTENSION CORD WITH BUILT-IN SAFETY PROTECTION

[76] Inventors: Steven Campolo, 69 Liberty Blvd., Valley Stream, N.Y. 11580; Saul Rosenbaum, 1464 Tyler Ave., East Meadow, N.Y. 11554

[21] Appl. No.: 522,445

[22] Filed: Aug. 31, 1995

[51] Int. Cl.$^6$ .................................................. H02H 3/00
[52] U.S. Cl. .............................. 361/42; 361/45; 361/115
[58] Field of Search ............................ 361/42, 45, 115

[56] References Cited

U.S. PATENT DOCUMENTS

| | | | |
|---|---|---|---|
| 3,769,549 | 10/1973 | Bangert, Jr. | 317/18 |
| 4,094,569 | 6/1978 | Dietz | 339/40 |
| 4,435,032 | 3/1984 | Abramson et al. | 339/36 |
| 4,579,405 | 4/1986 | Hirooka | 339/14 L |
| 4,810,070 | 3/1989 | Suda et al. | 350/413 |
| 4,879,098 | 11/1989 | Oberhardt et al. | 422/101 |
| 4,930,047 | 5/1990 | Peterson | 361/395 |
| 5,102,345 | 4/1992 | Stanwick et al. | 439/181 |
| 5,198,955 | 3/1993 | Willner | 361/42 |
| 5,294,374 | 3/1994 | Martinez et al. | 252/518 |
| 5,397,930 | 3/1995 | Nilssen | 307/150 |

*Primary Examiner*—Jeffrey A. Gaffin
*Assistant Examiner*—Stephen Jackson
*Attorney, Agent, or Firm*—Paul J. Sutton

[57] ABSTRACT

An electrical extension cord with built-in safety protection includes an electrical cable formed with insulated phase, neutral and ground conductors surrounded by a braided sensing shield. An electrical receptacle is electrically connected to the cable at first ends of each of the phase, neutral and ground conductors, and the shield is electrically connected to the ground conductor. A ground fault circuit interrupter (GFCI) is electrically connected to the cable at second ends of the phase, neutral and ground conductors, within which the ground conductor is electrically coupled to the shield through a predetermined impedance such that leakage current is collected by the shield and detected by the GFCI.

13 Claims, 2 Drawing Sheets

ELECTRICAL EXTENSION CORD WITH BUILT-IN SAFETY PROTECTION

BACKGROUND OF THE INVENTION

The present invention relates to electrical extension and power supply cords and, more particularly, relates to electrical extension and power supply cords which include built-in safety protection.

The ubiquitous extension cord, found in practically every residence wired with electrical power, needs little introduction. A complete extension cord includes a plug, usually comprising two or three prongs, a cord, typically comprising two or three insulated wires several feet in length and a terminal connector or receptacle for receiving one or more electrical plugs to power lamps, radios, televisions, household appliances, etc. A grounded extension cord includes a plug having three prongs and a three insulated wire cord, two wires of which are utilized for phase and return power and a third utilized as common ground. While extension cord use presents many advantages, there are some disadvantages associated as well. For example, extension cords are often left underneath rugs where they are trampled and pinched by doors and furniture, leading to arcing or short circuiting, which can cause fire. Extension cords also frequently tend to be left coiled whereby heat can concentrate, or are overloaded to the point of destruction by fire. Given the number of dangerous situations which could develop pursuant to extension cord use and abuse, such as residential fires and electrocution, an extension cord design offering some protection in anticipation of homeowner/user abuse would be well received.

An electrical extension cord including safety protection would be particularly well received at premises occupied by inquisitive young children. To say the least, such a population is known to probe and/or taste every "thing" they come into contract with. In particular, electrical extension cord receptacles may very well include unused ports into which conductive foreign objects such as paper clips, keys, screwdrivers, and the like may be inserted by an exploring child. This activity may very well result in electrical shock, which could injure or, in the worst case, kill the child. The danger has long been recognized and extension cord manufacturers have made various attempts to prevent such injuries.

For example, one prior art approach for improving the safety of electrical extension cords uses a pseudo twin-prong plug formed of a non-conductive material to block access to unused receptacle ports. Unfortunately, however, children appear to have no more difficulty than adults in removing such plugs from the receptacles in which they reside. Another conventional approach includes the use of a disk rotatably mounted to cover the receptacle ports, such as an arrangement described in U.S. Pat. No. 4,879,098. Yet another approach includes the use of moveable plates to prevent access to electrical receptacle ports. For example, U.S. Pat. No. 4,810,070 discloses the use of a plate held to the connector body by flanges, and U.S. Pat. No. 4,094,569 discloses the use of a plate secured to the connector body by a central barbed stake. Access to each receptacle port requires using the plug for insertion as a tool to align port slots and thereby enable insertion of the plug. While such remedies may offer some support in efforts to prevent misuse of plugs or receptacles associated with electrical extension cords, such remedies do not address problems associated with trampled, pinched, ruptured or overloaded electrical power and/or extension cords.

OBJECTS AND SUMMARY OF THE INVENTION

It is therefore an object of the present invention to provide an electrical extension and/or power cord which overcomes the above-described shortcomings of the prior art.

Is another object of the present invention to provide an electrical extension and/or power cord which will render itself non-conductive at the detection of a dangerous electrical condition existing in the extension cord.

It is still another object of the present invention to provide an electrical extension and/or power cord with ground fault circuit interrupt capability by which current flowing through the extension cord will be interrupted at detection of a dangerous electrical condition.

It is still yet another purpose of the present invention to provide an electrical extension and/or power cord which includes a means for "capturing" leakage or ground fault current escaping from conductors therein and cutting off current flow through the extension cord in response thereto, thereby preventing such dangerous conditions as overheating and consequential insulation breakdown, sputtering arc, and shorts due to abrasions, cuts, or nicks in the coil, etc.

To that end, an electrical extension and/or power cord which includes built-in safety protection is provided hereby which comprises an electrical cable (i.e., cord) including insulated phase, neutral and ground conductors surrounded by a braided sensing shield. An electrical receptacle including phase, neutral and ground ports is electrically connected to a first end of the cable at the line, neutral and ground conductors. The braided shield is electrically connected at the receptacle to the ground conductor. A second end of the cable is electrically connected (via the phase, neutral and ground conductors) to a plug which includes phase, neutral and ground plug blades for insertion into a receptacle source of electric power. The braided shield extends to the plug to protect the full length of the cable. Accordingly, leakage current released from the conductors may be collected in the shield and detected by the ground fault circuit interrupter.

In a preferred form, the electrical extension and/or power cord of this invention includes ground fault circuit interrupt protection in the form of a GFCI and a grounding shield surrounding conductors extending through the cord. The GFCI may embody any conventional device for use in sensing and, under particular circumstances, disconnecting or open circuiting the current path through the extension cord. The cord is preferably a SJTW-A with a "wrap" (braid) surrounding three insulated line conductors. The purpose of the braid is to "capture" any type of leakage current or ground fault current within the extension cord such that the GFCI may detect the current flow imbalance. The braid, therefore, directly protects the cord itself, while offering inadvertent (indirect) protection to the appliance or appliances which it serves.

If the cord of this invention were to overheat and the insulation break down, the chances of any leakage current getting to the ground wire are small by comparison to the chance that the surrounding braid will capture that leakage current. The GFCI would then open-circuit the path through the cord, preventing any damage. The braid will also be able to pick up sputtering line to neutral or inline arcs (P-N) which could go unnoticed without the braid. The same feature would work if the cord were abraded, cut, nicked, etc. The capture effect of the braid, therefore, offers unique fire protection. In a variation on the preferred form, the electrical extension cord may also include a light emitting diode (LED) monitor which is illuminated when the braid is intact. If the braid were to become discontinuous, the LED would extinguish, depicting a lack of protection. Such feature could also be embodied as an audible annunciator, or for tripping the GFCI with allied circuitry.

DETAILED DESCRIPTION OF THE PREFERRED EMBODIMENT

Figure 1:
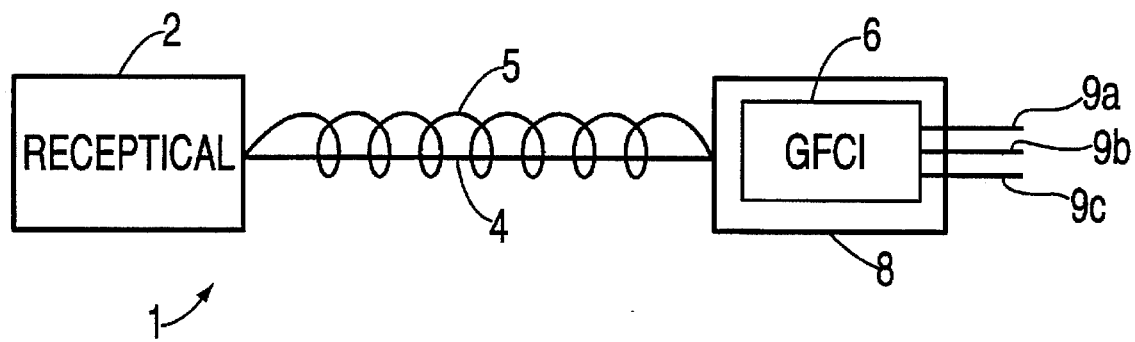
FIG. 1 is a schematic diagram of an electrical extension cord with safety protection of the present invention.

An electrical extension and/or power cord including built-in safety protection 1 of the present invention (hereinafter "extension cord") will now be described with reference to FIG. 1. An electrical plug 8 of the extension cord 1 is shown in the figure including a ground fault circuit interrupter 6 (GFCI). Both the plug and the GFCI are provided within a housing. A line end of the GFCI is connected to three plug blades 9a, 9b, 9c to access phase, neutral and ground terminals of a power source. A cord portion comprises an electrical cable 4, preferably including a phase, neutral and ground conductor surrounded by a braided, conductive shield 5. Cable 4 is electrically attached to the plug/GFCI combination within the housing. The conductive shield is electrically connected to the ground conductor at receptacle 2. The phase and neutral conductors are electrically connected to phase and neutral terminals of the GFCI therein. Leakage current is picked up by the conductive shield, which extends the full length of the cable.

Conductive shield 5 is preferably a fine mesh flexible shield (i.e., copper) surrounding a normal three-conductor extension cord 4. If conditions occur which severely damage the cord 4, theoretically, the first thing that would occur is that one of the three conductors contained within the cord would come in contact with the external copper fine mesh shield. Because the shield is electrically connected to the ground conductor, excess ground fault or leakage current is passed to ground while the GFCI detects an imbalance within the phase or neutral conductor and trips to open circuit the electrical path through the cord. Accordingly, the braid and GFCI combination protect the electrical extension cord itself directly, instead of directly protecting the appliance (i.e., a load) to which the cord is supplying power, as would a traditional GFCI arrangement. If the electrical extension cord of this invention were to overheat and the insulation break down, the chance of any leakage current getting directly to the ground wire is small in comparison to the chance that the braid will capture the leakage current. Such a "capture effect" offers efficient fire protection.

Figure 2A:
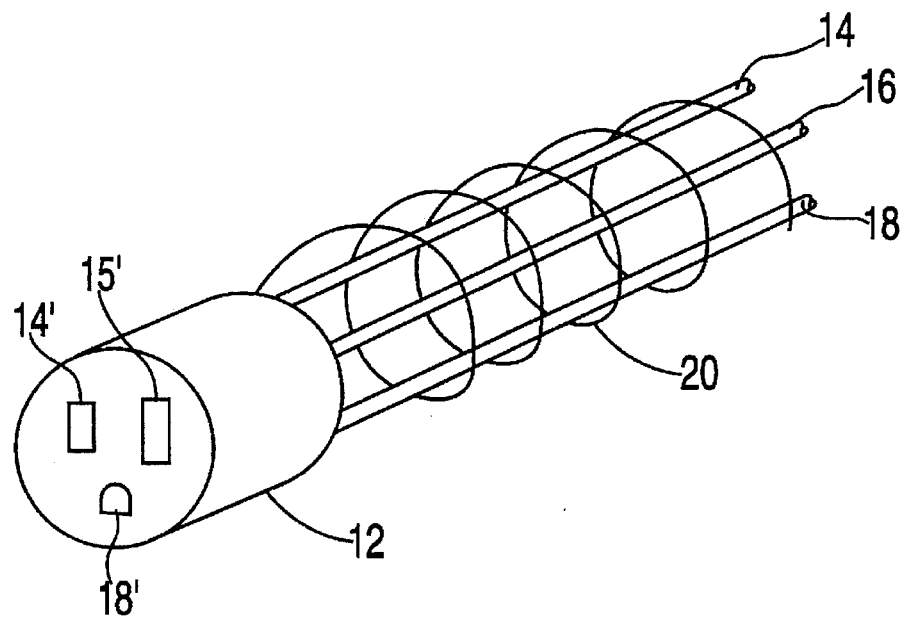
Fig. 2A is a perspective diagram of a receptacle end portion of an electrical extension cord of this invention.
Figure 2B:
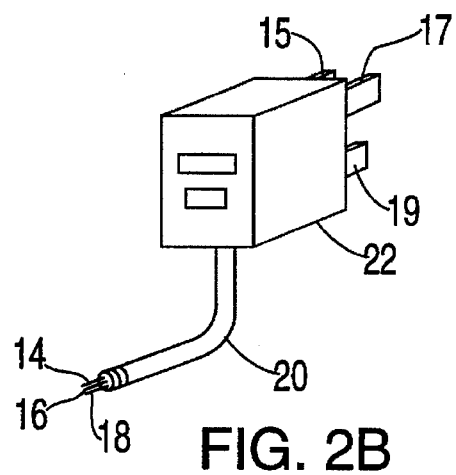
FIG. 2B is a perspective view of a plug portion of an electrical extension cord of the present invention.

FIG. 2A depicts an electrical receptacle 12 which is electrically connected to a first end portion of a phase wire 14, a neutral wire 16 and a ground wire 18, which may be utilized within an electrical extension and/or power cord with built-in safety protection of the present invention. Connector 12 also shows a portion of conductive braid 20 (i.e., fine mesh shield) which is electrically connected to ground wire 18 at receptacle 12. FIG. 2B shows a plug 22 including a plug housing and plug phase 15, neutral 17, and ground 19 blades electrically connected to second ends of a phase 14, neutral 16 and ground 18 ends of electrical conductors, those conductors surrounded by a portion of conductive mesh braid 20. Plug 22 also includes within the housing a ground fault circuit interrupter, such as GFCI 8 shown in FIG. 1. The phase, neutral and ground conductors are electrically connected to phase and neutral load-side terminals of the GFCI, the ground conductor connected through the plug to a ground blade.

Figure 3B:
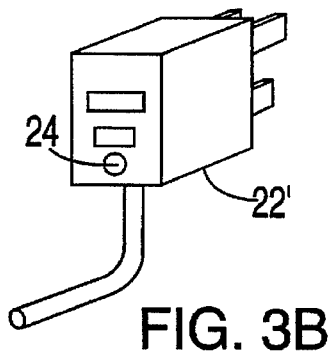
FIG. 3B is a perspective view of a plug which may be implemented with the embodiment of FIG. 3A.
Figure 3A:
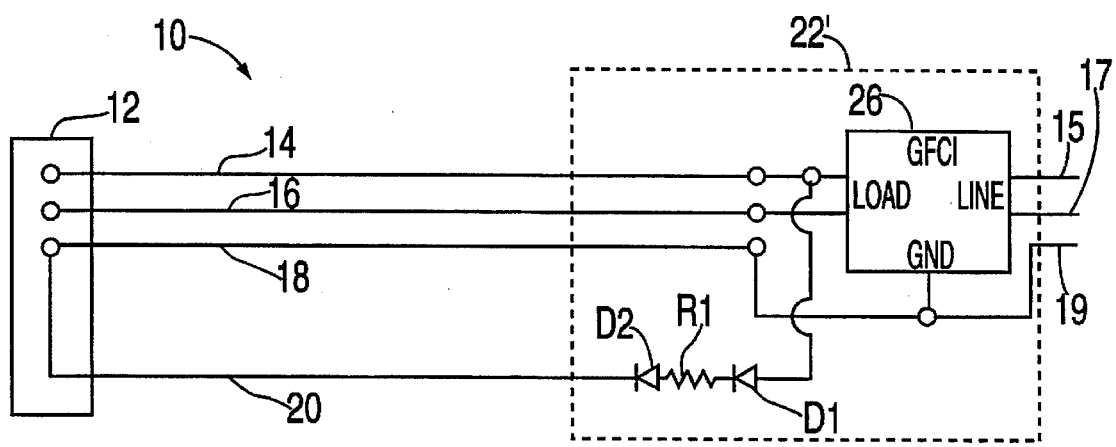
FIG. 3A is a circuit diagram of yet another embodiment of the electrical extension cord of the present invention.

FIG. 3A shows a detailed schematic diagram of an electrical extension and/or power cord 10 of the present invention which includes a means for communicating a status of the operability of the built-in safety protection. Extension cord 10 includes an electrical plug similar to that shown in FIG. 2B and described above, electrically connected via phase, neutral and ground conductors 14, 16, 18 to a plug housing 22'. The phase and neutral conductors are electrically connected to load side phase and neutral ports of a ground fault circuit interrupter 26. The ground conductor is also electrically connected to a ground port in the GFCI, as well as a plug ground blade. Line end ports of the GFCI are electrically connected to phase and neutral plug blades which extend from the GFCI through the plug housing for mating with a power source.

Phase conductor 14 is also electrically connected to an anode end of a diode D1 within the housing 22'. A cathode end of diode D1 is electrically connected through a resistor R1 to an anode end of a light emitting diode D2, also contained within the housing. The cathode end of light emitting diode D2 is electrically connected to the ground shield 20. Light emitting diode (LED) D2 is illuminated when the braid is intact with a current flowing from the load end side of GFCI 26 through diode D1 and resistor R1 to the ground wire at receptacle 12. If the braid were to become discontinuous, the LED would be extinguished depicting a lack of protection. While these means for monitoring the integrity of the protection provided are preferred, the invention is not limited thereto. Any means known to those skilled in the art for monitoring the integrity of a cord may be implemented without deviating from the scope defined herein. For example, the means for identifying a conductive state through the braided portion of the extension cord may embody an audible annunciator or any other communicating means known to those skilled in the art.

FIG. 3B shows a perspective view of a plug 22', including an aperture 24 within which an LED D2 may be mounted for commuicating the cord's operability to a user. Preferably, a maximum current of around one milliamp or less is limited by the resistance of resistor R1. For example, a 240 Kilo ohm resistor will limit current flow through the braid to approximately 0.5 milliamps to maintain means for communicating the operability of the braided protection. Accordingly, the LED will be powered unless the current path through the braid to ground at the receptacle is compromised. In another embodiment, a blinking LED is included and powered unless the current path through the braid to ground is compromised. The blinking nature of the LED requires the maintenance of a lower current in the braid while operational.

What has been described herein is merely illustrative of one or several embodiments of the invention. The description, however, is not meant to limit in any way the scope or spirit of the inventive concept embodied herein.

What is claimed is:

1. An electrical extension cord including built-in safety protection, comprising:

an electrical cable including separate, insulated phase, neutral and ground conductors surrounded by a conductive sensing shield;

an electrical receptacle electrically connected to said cable at first ends of said phase, neutral and ground conductors, and wherein said shield is electrically connected to said ground conductor; and an electrical plug comprising a plug housing, phase, neutral and ground plug blades, and a ground fault circuit interrupter (GFCI), wherein said GFCI is electrically connected at load end phase and neutral ports to said cable at second ends of said phase and neutral conductors, and at line end phase and neutral ports to said phase and neutral plug blades and wherein said ground conductor is electrically connected to said ground plug blade, whereby leakage current is collected by said shield enabling protection by said GFCI.

2. The cord defined by claim 1, wherein said cable is an SJTW-A cable.

3. The cord defined by claim 1, wherein said GFCI includes a faceless housing with plug blades.

4. The cord defined by claim 3, wherein said housing comprises a thermoplastic material.

5. The cord defined by claim 1, wherein said load-side phase port of said GFCI is electrically coupled to said cable within said housing across a predetermined impedance.

6. The cord defined by claim 5, wherein said impedance includes a diode and a resistor having values which will limit current flow through said shield to within a range of around 0.01 to around 1.0 milliamp.

7. The cord defined by claim 6, wherein said resistor is approximately 240 Kohms.

8. The cord defined by claim 5, wherein said impedance includes a light emitting diode (LED) for identifying an integrity of said shield.

9. The cord defined by claim 8, wherein said LED is powered intermittantly to minimize current present in said shield.

10. The cord defined by claim 8, wherein an LED is mounted on said housing and electrically included in said impedance.

11. An electrical power cord including built-in safety protection, comprising:

an electrical cable including separate, insulated phase, neutral and ground conductors surrounded by a conductive sensing shield, wherein said cable is electrically connected at first ends of said phase, neutral and ground conductors to an electrical load to be powered and a first end of said sensing shield is electrically connected to said ground conductor; and an electrical plug comprising plug housing, phase, neutral and ground plug blades, and a ground fault circuit interrupter (GFCI), wherein said GFCI is electrically connected at load end phase and neutral ports to said cable at second ends of said phase and neutral conductors, and at line end phase and neutral ports to said phase and neutral plug blades and wherein said ground conductor is electrically connected to said ground plug blade, such that leakage current is collected by said shield enabling protection of said power cord by said GFCI.

12. A method of making an electrical extension cord with safety protection from fire and shock, comprising:

providing an electrical cable including separate, insulated phase, neutral and ground conductors;

surrounding said phase, neutral and ground conductors with a conductive sensing shield;

electrically connecting an electrical receptacle to said cable at first ends of said phase, neutral and ground conductors;

electrically connecting said sensing shield to said ground conductor;

providing an electrical plug comprising a plug housing, phase, neutral and ground plug blades, and a ground fault circuit interrupter (GFCI);

electrically connecting said GFCI at load end phase and neutral ports to said cable at second ends of said phase and neutral conductors, and at line end phase and neutral ports to said phase and neutral plug blades; and electrically connecting said ground conductor to said ground plug blade.

13. A method of making an electrical power cord associated with an electrical load with safety protection from fire and shock comprising:

providing an electrical cable including separate, insulated phase, neutral and ground conductors;

surrounding said phase, neutral and ground conductors with a conductive sensing shield;

electrically connecting said electrical load to be powered to said cable at first ends of said phase, neutral and ground conductors;

electrically connecting said sensing shield to said ground conductor;

providing an electrical plug comprising a plug housing, phase, neutral and ground plug blades, and a ground fault circuit interrupter (GFCI);

electrically connecting said GFCI at load end phase and neutral ports to said cable at second ends of said phase and neutral conductors, and at line end phase and neutral ports to said phase and neutral plug blades; and electrically connecting said ground conductor to said ground plug blade.

* * * * *

UNITED STATES PATENT AND TRADEMARK OFFICE
CERTIFICATE OF CORRECTION

PATENT NO. : 5,642,248
DATED : June 24, 1997
INVENTOR(S) : Steven Campolo, et al.

It is certified that error appears in the above-identified patent and that said Letters Patent is hereby corrected as shown below:

On the title page item [73], insert --Leviton Manufacturing CO., INC.,--.

Signed and Sealed this

Third Day of November, 1998

Attest:

Attesting Officer

BRUCE LEHMAN

Commissioner of Patents and Trademarks